(12) United States Patent
Zhang et al.

(10) Patent No.: US 8,501,653 B2
(45) Date of Patent: Aug. 6, 2013

(54) HEAT-TREATED ZIEGLER-NATTA CATALYSTS FOR ETHYLENE POLYMERIZATION

(75) Inventors: Lei Zhang, Seabrook, TX (US); David Knoeppel, League City, TX (US)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 13/028,390

(22) Filed: Feb. 16, 2011

(65) Prior Publication Data

US 2012/0208970 A1 Aug. 16, 2012

(51) Int. Cl.
*B01J 3/00* (2006.01)
*B01J 37/00* (2006.01)
*C08F 4/02* (2006.01)
*C08F 4/60* (2006.01)

(52) U.S. Cl.
USPC ............ 502/107; 502/132; 502/113; 502/133

(58) Field of Classification Search
USPC ............... 526/124.3; 502/107, 113, 132, 133
See application file for complete search history.

(56) References Cited

U.S. PATENT DOCUMENTS

| | | | |
|---|---|---|---|
| 6,054,406 A | 4/2000 | Smith et al. | |
| 6,734,134 B1 * | 5/2004 | Gray et al. | 502/132 |
| 6,916,895 B2 | 7/2005 | Gray et al. | |
| 7,169,727 B2 | 1/2007 | Thorman | |
| 7,473,664 B2 | 1/2009 | Vizzini et al. | |
| 7,655,590 B2 | 2/2010 | Enriquez et al. | |
| 2001/0008869 A1 | 7/2001 | Garoff et al. | |
| 2002/0143123 A1 * | 10/2002 | Dekmezian et al. | 526/119 |
| 2003/0018143 A1 | 1/2003 | Gray et al. | |
| 2004/0058802 A1 | 3/2004 | Knoeppel et al. | |
| 2007/0060725 A1 | 3/2007 | Zoeckler et al. | |
| 2007/0299224 A1 * | 12/2007 | Vizzini et al. | 526/176 |
| 2009/0203856 A1 | 8/2009 | Vizzini et al. | |

FOREIGN PATENT DOCUMENTS

EP 0494084 B1 7/1997

* cited by examiner

*Primary Examiner* — David W Wu
*Assistant Examiner* — Elizabeth Eng

(57) ABSTRACT

Catalyst systems, processes of forming the same and polymers formed therefrom are described herein. The processes of forming the catalyst systems generally include contacting a blend of an alkyl magnesium compound and an organoaluminum compound with an alcohol to form a magnesium dialkoxide compound; contacting the magnesium dialkoxide compound with a first agent to form a solution of reaction product "A", the first agent including a halogenating/titanating agent; contacting the solution of reaction product "A" with a second agent to form a solid reaction product "B", the second agent including a blend of a first metal halide and a metal alkoxide; contacting the solid reaction product "B" with a third agent to form a solid reaction product "C", the third agent including a second metal halide; contacting the solid reaction product "C" with a fourth agent to form a solid reaction product "D", the fourth agent including a third metal halide; contacting the solid reaction product "D" with a fifth agent to form a catalyst component, the fifth agent including a reducing agent; and heating an intermediate selected from reaction product "A", reaction product "B", reaction product "C", reaction product "D" and combinations thereof to form a heat-treated catalyst that results in a shear response and a molecular weight distribution for a polymer produced by the heat-treated catalyst that are greater than a shear response and a molecular weight distribution for a polymer produced by an identical non-heat-treated catalyst.

16 Claims, 1 Drawing Sheet

HEAT-TREATED ZIEGLER-NATTA CATALYSTS FOR ETHYLENE POLYMERIZATION

FIELD

Embodiments of the present invention generally relate to methods of forming Ziegler-Natta type catalyst compositions.

BACKGROUND

Many processes for forming Ziegler-Natta catalyst systems are known. However, few of those processes include heat treatment and such processes do not suggest that heat-treatment of catalyst intermediates (rather than preactivated catalysts) will provide any effect in polymer shear response and molecular weight distribution. Moreover, in certain cases, heat-treatment of catalyst and its intermediates can pose adverse effect on catalyst activity.

Therefore, it is desirable to develop processes for forming heat-treated Ziegler-Natta catalysts that can modify polymer shear properties and/or polymer molecular weight distribution properties without decreasing catalyst activity.

SUMMARY

Embodiments of the present invention include processes of forming catalyst systems. The processes generally include contacting a blend of an alkyl magnesium compound and an organoaluminum compound with an alcohol to form a magnesium dialkoxide compound; contacting the magnesium dialkoxide compound with a first agent to form a solution of reaction product "A", the first agent including a halogenating/titanating agent; contacting the solution of reaction product "A" with a second agent to form a solid reaction product "B", the second agent including a blend of a first metal halide and a metal alkoxide; contacting the solid reaction product "B" with a third agent to form a solid reaction product "C", the third agent including a second metal halide; contacting the solid reaction product "C" with a fourth agent to form a solid reaction product "D", the fourth agent including a third metal halide; contacting the solid reaction product "D" with a fifth agent to form a catalyst component, the fifth agent including a reducing agent; and heating an intermediate selected from reaction product "A", reaction product "B", reaction product "C", reaction product "D" and combinations thereof to form a heat-treated catalyst that results in a shear response and a molecular weight distribution for a polymer produced by the heat-treated catalyst that are greater than a shear response and a molecular weight distribution for a polymer produced by an identical non-heat-treated catalyst.

One or more embodiments include the process of the preceding paragraph, wherein the alkyl magnesium compound is selected from butyl ethyl magnesium, diethyl magnesium, dipropyl magnesium, dibutyl magnesium and combinations thereof.

One or more embodiments include the process of any preceding paragraph, wherein the organoaluminum compound is selected from triethyl aluminum, trimethyl aluminum, triisobutyl aluminum and combinations thereof.

One or more embodiments include the process of any preceding paragraph, wherein the alcohol is selected from 2-ethylhexanol, butanol, isobutanol and combinations thereof.

One or more embodiments include the process of any preceding paragraph, wherein the magnesium dialkoxide compound is magnesium 2-ethylhexyl alkoxide ($Mg(2-EHO)_2$).

One or more embodiments include the process of any preceding paragraph, wherein the first agent is generally represented by the formula:

wherein A is selected from titanium, silicon, aluminum, carbon, tin and germanium, $R^4$ is selected from $C_1$ to $C_{10}$ linear or branched alkyls comprising methyl, ethyl, propyl and isopropyl, x is 0 or 1, and y is the valence of A minus x.

One or more embodiments include the process of any preceding paragraph, wherein the first agent is a halogenating/titanating agent selected from chlorotitaniumtriisopropoxide ($ClTi(O^iPr)_3$), chlorotrimethylsilane ($ClSi(Me)_3$) and combinations thereof.

One or more embodiments include the process of any preceding paragraph, wherein the second agent is generally represented by the formula:

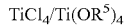

wherein $R^5$ is selected from $C_2$ to $C_{20}$ alkyl groups.

One or more embodiments include the process of any preceding paragraph, wherein the second agent is selected from a titanium tetrachloride/tetra n-butyl titanate ($TiCl_4$/TNBT) blend, a titanium tetrachloride/titanium 2-ethylhexyl alkoxide blend, and combinations thereof.

One or more embodiments include the process of any preceding paragraph, wherein the third agent is titanium tetrachloride ($TiCl_4$).

One or more embodiments include the process of any preceding paragraph, wherein the fourth agent is titanium tetrachloride ($TiCl_4$).

One or more embodiments include the process of any preceding paragraph, wherein the fifth agent comprises an organoaluminum compound selected from triethyl aluminum, trimethyl aluminum, triisobutyl aluminum and combinations thereof.

One or more embodiments include the process of any preceding paragraph, wherein heating to form the heat-treated catalyst is conducted at a temperature in the range of from about 80° C. to about 150° C., and is for a time period in the range of about thirty minutes to about twenty-four hours.

One or more embodiments include the process of any preceding paragraph, wherein the polymer has a shear response (SR5) of greater than 10.0.

One or more embodiments include the process of any preceding paragraph, wherein the polymer has a molecular weight distribution of greater than 6.5.

One or more embodiments include a heat-treated Ziegler-Natta catalyst formed from the process of any preceding paragraph.

One or more embodiments include a polymerization process. The polymerization process generally includes introducing an olefin monomer into a reaction zone; contacting the olefin monomer with a heat-treated Ziegler-Natta catalyst formed from the process of any preceding paragraph to form a polyolefin; and withdrawing the polyolefin from the reaction zone.

One or more embodiments include polyethylene formed by the process of any preceding paragraph.

One or more embodiments include the polyethylene of the preceding paragraph, wherein the polyethylene exhibits a melt strength of from about 6.5 cN (centinewton) to about 11 cN.

DETAILED DESCRIPTION

Introduction and Definitions

Figure 1:
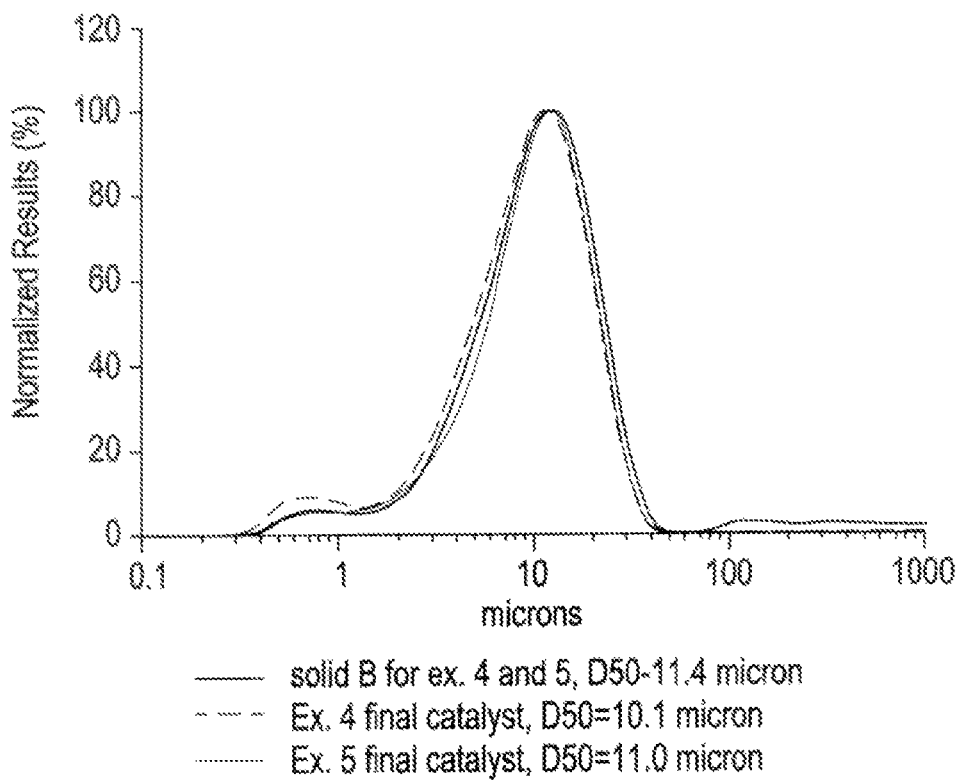
FIG. 1 illustrates a graph of particle size distributions for certain examples using heat-treated catalysts as compared to a non-heat-treated catalyst.

A detailed description will now be provided. Each of the appended claims defines a separate invention, which for infringement purposes is recognized as including equivalents to the various elements or limitations specified in the claims. Depending on the context, all references below to the "invention" may in some cases refer to certain specific embodiments only. In other cases it will be recognized that references to the "invention" will refer to subject matter recited in one or more, but not necessarily all, of the claims. Each of the inventions will now be described in greater detail below, including specific embodiments, versions and examples, but the inventions are not limited to these embodiments, versions or examples, which are included to enable a person having ordinary skill in the art to make and use the inventions when the information in this patent is combined with available information and technology.

Various terms as used herein are shown below. To the extent a term used in a claim is not defined below, it should be given the broadest definition skilled persons in the pertinent art have given that term as reflected in printed publications and issued patents at the time of filing. Further, unless otherwise specified, all compounds described herein may be substituted or unsubstituted and the listing of compounds includes derivatives thereof.

Further, various ranges and/or numerical limitations may be expressly stated below. It should be recognized that unless stated otherwise, it is intended that endpoints are to be interchangeable. Further, any ranges include iterative ranges of like magnitude falling within the expressly stated ranges or limitations.

As used herein, the term "activity" refers to the weight of product produced per weight of the catalyst used in a process per hour of reaction at a standard set of conditions (e.g., grams product/grams catalyst/hour).

As used herein, the term "blend" refers to a mixture of compounds that are blended and/or mixed prior to contact with another compound.

As used herein, the term "ethylene based polymers" is used interchangeably with the terms "ethylene polymer" or "polyethylene" and refers to a polymer having at least about 50 wt. % (weight percent), or at least about 70 wt. %, or at least about 75 wt. %, or at least about 80 wt. %, or at least about 85 wt. % or at least about 90 wt. % polyethylene relative to the total weight of polymer, for example.

As used herein, the term "equivalent" refers to a molar ratio of a component to a starting material, which as used herein, is either the alkyl magnesium compound or the magnesium dialkoxide compound, in some embodiments.

As used herein, the term "high load melt index" (HLMI) refers to a rate of flow of a molten polymer through an orifice of 0.0825 inch diameter when subjected to a force of 21.6 kg (kilograms) at 190° C., and is measured via ASTM-D-1238-F.

As used herein, the term "medium density polyethylene" refers to ethylene based polymers having a density of from about 0.92 W/cc (gram per cubic centimeter) to about 0.94 g/cc or from about 0.926 g/cc to about 0.94 g/cc, for example.

As used herein, the term "high density polyethylene" refers to ethylene based polymers having a density of from about 0.94 g/cc to about 0.97 g/cc, for example.

As used herein, the term "melt flow index" refers to a measure of the ease of flow of the melt of a thermoplastic polymer and is measured via ASTM-D-1238-E.

As used herein, the term "melt index ratio" refers to a ratio between two melt flow rates at different gravimetric weights and is measured via ASTM-D-1238-F.

As used herein, the term "molecular weight distribution" (MWD) refers to the ratio of the weight average molecular weight to the number average molecular weight ($M_w/M_n$) of a polymer.

As used herein, the term "polymer density" refers to a measurement of the mass per unit volume of a polymer and is measured via ASTM-D-1238.

As used herein, the term "room temperature" includes a temperature of from about 20° C. (degrees Celsius) to about 28° C. (68° F. (degrees Fahrenheit) to 82° F.) However, room temperature measurements generally do not include close monitoring of the temperature of the process and therefore such a recitation does not intend to bind the embodiments described herein to any predetermined temperature range. Furthermore, a temperature difference of a few degrees does not matter to the phenomenon under investigation, such as a preparation method.

As used herein, the term "shear response" refers to a ratio of a high load melt index (see above) to a melt flow index (see above) of a polymer.

As used herein, the term "solution" refers to a homogenous mixture of two or more compounds.

As used herein, the term "span" refers to a catalyst particle size distribution and is calculated by the following equation:

$$\text{Span} = \frac{D_{90} - D_{10}}{D_{50}}$$

As used herein, the term "substituted" refers to an atom, radical or group that replaces a hydrogen in a chemical compound.

Catalyst Systems

Ziegler-Natta catalyst systems are generally formed from the combination of a metal component (e.g., a catalyst precursor) with one or more additional components, such as a catalyst support, a cocatalyst and/or one or more electron donors, for example.

A specific example of a Ziegler-Natta catalyst includes a metal component generally represented by the formula:

$$MR^4_x;$$

wherein M is a transition metal, $R^4$ is a halogen, an alkoxy or a hydrocarboxyl group, and x is the valence of the transition metal. For example, x may be from 1 to 4.

The transition metal may be selected from Groups IV through VIB (e.g., titanium, vanadium or chromium), for example. $R^4$ may be selected from chlorine, bromine, carbonates, esters, or alkoxy groups in one embodiment. Examples of catalyst components include $TiCl_4$, $TiBr_4$, $Ti(OC_2H_5)_3Cl$, $Ti(OC_3H_7)_2Cl_2$, $Ti(OC_6H_{13})_2Cl_2$, $Ti(OC_2H_5)_2Br_2$ and $Ti(OC_{12}H_{25})Cl_3$, for example.

Those skilled in the art will recognize that a catalyst may be "activated" in some way before it is useful for promoting polymerization. As discussed further below, activation may be accomplished by contacting the catalyst with a Ziegler-Natta activator (Z-N activator), which is also referred to in some instances as a "cocatalyst," Embodiments of such Z-N activators include organoaluminum compounds, such as triethyl aluminum (TEAl), trimethyl aluminum (TMA) and triisobutyl aluminum (TIBAl), for example.

The Ziegler-Natta catalyst system may further include one or more electron donors, such as internal electron donors and/or external electron donors. Internal electron donors may be used to reduce the atactic form of the resulting polymer, thus decreasing the amount of xylene solubles in the polymer. The internal electron donors may include amines, amides, esters, ketones, nitriles, ethers, phosphines, diethers, succinates, phthalates, or dialkoxybenzenes, for example. (See, U.S. Pat. No. 5,945,366 and U.S. Pat. No. 6,399,837, which are incorporated by reference herein.)

External electron donors may be used to further control the amount of atactic polymer produced. The external electron donors may include monofunctional or polyfunctional carboxylic acids, carboxylic anhydrides, carboxylic esters, ketones, ethers, alcohols, lactones, organophosphorus compounds and/or organosilicon compounds. In one embodiment, the external donor may include diphenyldimethoxysilane (DPMS), cyclohexymethyldimethoxysilane (CDMS), diisopropyldimethoxysilane and/or dicyclopentyldimethoxysilane (CPDS), for example. The external donor may be the same or different from the internal electron donor used.

The components of the Ziegler-Natta catalyst system (e.g., catalyst, activator and/or electron donors) may or may not be associated with a support, either in combination with each other or separate from one another. The Z-N support materials may include a magnesium dihalide, such as magnesium dichloride or magnesium dibromide, or silica, for example.

Prior efforts to form the Ziegler-Natta catalyst generally included the methods described below. (See, U.S. Pat. No. 6,734,134 and U.S. Pat. No. 6,174,971, which are incorporated by reference herein.)

A representative, non-limiting, illustration of a possible reaction scheme may be illustrated as follows:

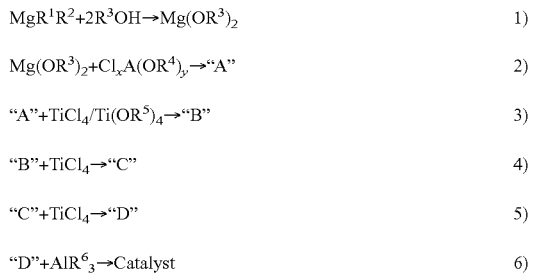

Note that while the primary reaction components are illustrated above, additional components may be reaction products, or used in such reactions, and not illustrated above. Further, while described herein in terms of primary reaction steps, it is known to those skilled in the art that additional steps may be included in the reaction schemes and processes described herein (e.g., washing, filtering, drying or decanting steps), while it is further contemplated that other steps may be eliminated in certain embodiments. In addition, it is contemplated that any of the agents described herein may be added in combination with one another so long as the order of addition complies with the spirit of the invention.

Such methods generally include contacting an alkyl magnesium compound with an alcohol to form a magnesium dialkoxide compound. The alkyl magnesium compound may contain a trace amount of organoaluminum compound in the structure of $AlR^6_3$ as solublizing agent. Such reaction may occur at a reaction temperature ranging from room temperature to about 90° C. for a time of up to about 10 hours, for example.

The alcohol may be added to the alkyl magnesium compound in an amount sufficient to completely convert all reducing metal alkyls into non-reducing metal alkoxides. For example, the alcohol may be added to the alkyl magnesium compound in an equivalent of from about 0.5 to about 6 or from about 1 to about 3, for example.

The alkyl magnesium compound may generally be represented by the following formula (I):

$$MgR^1R^2; \quad (I)$$

wherein $R^1$ and $R^2$ are independently selected from $C_1$ to $C_{10}$ alkyl groups. Non-limiting illustrations of alkyl magnesium compounds include butyl ethyl magnesium (BEM), diethyl magnesium, dipropyl magnesium and dibutyl magnesium, for example. The trace amount of $AlR^6_3$ may have $R^6$ as a $C_1$ to $C_{10}$ alkyl compounds. Non-limiting illustrations of organoaluminum compounds include aluminum alkyl compounds generally including triethyl aluminum (TEAl), trimethyl aluminum (TMA), triisobutyl aluminum (TIBAl), n-octyl aluminum and n-hexyl aluminum, for example.

The alcohol may generally be represented by the formula (II):

$$R^3OH; \quad (II)$$

wherein $R^3$ is selected from $C_2$ to $C_{20}$ linear or branched alkyl groups. Non-limiting illustrations of alcohols generally include 2-ethylhexanol, butanol and isobutanol, for example.

The method may then include contacting the magnesium dialkoxide compound with a first agent to form a reaction product "A". Preferably, the magnesium dialkoxide compound is contacted by the first agent to form a solution of reaction product "A".

Such reaction may occur in the presence of an inert solvent. A variety of hydrocarbons can be used as the inert solvent, but any hydrocarbon selected should remain in liquid form at all relevant reaction temperatures, and the ingredients used to form the supported catalyst composition should be at least partially soluble in the hydrocarbon. Accordingly, the hydrocarbon is considered to be a solvent herein, even though in certain embodiments the ingredients are only partially soluble in the hydrocarbon.

Suitable hydrocarbon solvents include substituted and unsubstituted aliphatic hydrocarbons and substituted and unsubstituted aromatic hydrocarbons. For example, the inert solvent may include hexane, heptane, octane, decane, toluene, xylene, dichloromethane, chloroform, 1-chlorobutane or combinations thereof, for example.

The reaction may further occur at a temperature of from about 0° C. to about 100° C. or from about 20° C. to about 90° C. for a time of from about 0.2 hours to about 24 hours or from about 1 hour to about 4 hours, for example.

The first agent may generally be represented by the following formula (III):

$$Cl_xA(OR^4)_y; \quad (III)$$

wherein A is selected from titanium, silicon, aluminum, carbon, tin and germanium, $R^4$ is selected from $C_1$ to $C_{10}$ linear or branched alkyls, such as methyl, ethyl, propyl and isopropyl, x is 0 or 1, and y is the valence of A minus x. Non-limiting illustrations of first agents include halogentating/titanating agents such as chlorotitaniumtriisopropoxide (ClTi(O$^i$Pr)$_3$) and chlorotrimethylsilane (ClSi(Me)$_3$), for example.

The method further includes contacting reaction product "A", such as a solution of reaction product "A", with a second agent to form a reaction product "B", such as a solid reaction product "B". The second agent may generally be represented by the following formula (IV):

$$TiCl_4/Ti(OR^5)_4 \quad (IV)$$

wherein $R^5$ is selected from $C_2$ to $C_{20}$ alkyl groups. Non-limiting illustrations of second agents include blends of titanium chloride and titanium alkoxides, such as titanium tetrachloride/titanium 2-ethylhexyl alkoxide, titanium tetrachloride/titanium n-butoxide and combinations thereof, for example. The blends may have an equivalent of $TiCl_4$:Ti$(OR^5)_4$ of from about 0.5 to about 6 or from about 2 to about 3, for example.

Such reaction may occur in the presence of an inert solvent. The inert solvents may include any of those solvents previously discussed herein, for example.

The method further includes contacting reaction product "B", such as a solid reaction product "B", with a third agent to form a reaction product "C", such as a solid reaction product "C". Such reaction may occur in the presence of an inert solvent, such as hexane. Alternatively, the inert solvents may include any of those solvents previously discussed herein, for example. The reaction may further occur at room temperature, for example.

Non-limiting illustrations of third agents include metal halides. The metal halides may include any metal halide known to one skilled in the art, such as titanium tetrachloride ($TiCl_4$), for example. The third agent may be added in a equivalent of from about 0.1 to about 5, or from about 0.25 to about 4 or from about 0.45 to about 2.5, for example.

The method may further include contacting reaction product "C", preferably the solid reaction product "C", with a fourth agent to form a reaction product "D", preferably a solid reaction product "D". Such reaction may occur in the presence of an inert solvent such as hexane. Such reaction may occur in the presence of an inert solvent, such as hexane. Alternatively, the inert solvents may include any of those solvents previously discussed herein, for example. The reaction may further occur at room temperature, for example.

Non-limiting illustrations of fourth agents include metal halides. The metal halides may include any metal halide known to one skilled in the art, such as titanium tetrachloride ($TiCl_4$), for example. The fourth agent may be added in a equivalent of from about 0.1 to about 5, or from about 0.25 to about 4 or from about 0.45 to about 2.5, for example.

The method may further include contacting reaction product "D", preferably the solid reaction product "D", with a fifth agent comprising a reducing agent to form a catalyst component or catalyst compound intermediate, preferably a Ziegler-Natta catalyst. The reducing agent may be selected from organolithium compounds, organomagnesium compounds, organoaluminum compounds and combinations thereof, for example.

The reducing agent may be added to the reaction product "D" in an equivalent of from about 0.1 to about 1.0 or from 0.1 to about 0.5, for example.

Non-limiting illustrations of reducing agents include organoaluminum compounds. The organoaluminum compounds may include aluminum alkyls having the following formula (V):

$$AlR^6_3; \quad (V)$$

wherein $R^6$ is a $C_1$ to $C_{10}$ alkyl compound. Non-limiting illustrations of the aluminum alkyl compounds generally include triethyl aluminum (TEAl), trimethyl aluminum (TMA), triisobutyl aluminum (TIBAl), n-octyl aluminum and n-hexyl aluminum, for example.

In one or more embodiments, the catalyst has a volume average particle size of from 4 to 50 microns, or from 5 to 20 microns, or from 6 to 15 microns, for example. In one or more embodiments, the catalyst generally exhibits narrow (e.g., a span of less than 1.5) unimodal particle size distributions.

However, in one or more embodiments, broader (e.g., a span of greater than 1.5) unimodal particle size distributions and sometimes bimodal particle size distributions (e.g., a span of greater than 3.5) are obtained. For example, a catalyst including a plurality of particle size peaks is considered to be "bimodal" and a catalyst having one particle size peak is considered to be "unimodal".

Embodiments of the invention include heat treatment to modify or affect catalyst activities, morphologies and polymer properties. It is desirable to improve Ziegler-Natta catalysts for improved film application by heat-treating the Ziegler-Natta catalyst intermediates in order to improve shear response and obtain a higher shear thinning of polymers produced with such heat-treated catalysts. It is further desirable to improve Ziegler-Natta catalysts for improved film application by heat-treating the Ziegler-Natta catalyst intermediates in order to improve molecular weight distribution (MWD) and obtain a broader MWD of polymers produced with such heat-treated catalysts.

Any of the catalyst intermediates (e.g., reaction product "A", reaction product "B", reaction product "C" or reaction product "D"), the final catalyst or combinations thereof, as discussed above, may be subjected to heat-treatment, Such heat-treatment generally includes heating the catalyst component to a temperature in the range of from about 40° C. to about 150° C., or from about 90° C. to about 125° C. or from about 40° C. to about 60° C., or at solvent boiling temperature, for example. Such heat-treatment may occur for a time of from about 0.5 hours to about 24 hours or from about 1 hour to about 4 hours, for example.

It has been observed that the embodiments of the invention are capable of forming polyethylene having a molecular weight distribution that is broader than a polyethylene formed via an identical process absent the heat treatment. For example, the MWD may be at least 2 units greater of from about 4 to about 10, or from about 6 to about 8 after heat-treatment. It has further been observed that the embodiments of the invention are capable of forming polyethylene having a higher shear response (SR5=HLMI/MI5) than a polyethylene formed via an identical process absent the heat treatment. For example, the SR5 may be at least 2 units, or from about 4 to about 15 or from about 6 to about 12 units higher after heat treatment.

Polymerization Processes

As indicated elsewhere herein, catalyst systems are used to form polyolefin compositions. Once the catalyst system is prepared, as described above and/or as known to one skilled in the art, a variety of processes may be carried out using that composition. The equipment, process conditions, reactants, additives and other materials used in polymerization processes will vary in a given process, depending on the desired composition and properties of the polymer being formed. Such processes may include solution phase, gas phase, slurry phase, bulk phase, high pressure processes or combinations thereof, for example. (See, U.S. Pat. No. 5,525,678; U.S. Pat. No. 6,420,580; U.S. Pat. No. 6,380,328; U.S. Pat. No. 6,359,072; U.S. Pat. No. 6,346,586; U.S. Pat. No. 6,340,730; U.S. Pat. No. 6,339,134; U.S. Pat. No. 6,300,436; U.S. Pat. No. 6,274,684; U.S. Pat. No. 6,271,323; U.S. Pat. No. 6,248,845; U.S. Pat. No. 6,245,868; U.S. Pat. No. 6,245,705; U.S. Pat. No. 6,242,545; U.S. Pat. No. 6,211,105; U.S. Pat. No. 6,207,606; U.S. Pat. No. 6,180,735 and U.S. Pat. No. 6,147,173, which are incorporated by reference herein.)

In certain embodiments, the processes described above generally include polymerizing one or more olefin monomers to form polymers. The olefin monomers may include $C_2$ to $C_{30}$ olefin monomers, or $C_2$ to $C_{12}$ olefin monomers (e.g., ethylene, propylene, butene, pentene, methylpentene, hexene, octene and decene), for example. The monomers may include olefinic unsaturated monomers, $C_4$ to $C_{18}$ diolefins, conjugated or nonconjugated dienes, polyenes, vinyl monomers and cyclic olefins, for example. Non-limiting examples of other monomers may include norbornene, nobornadiene, isobutylene, isoprene, vinylbenzocyclobutane, sytrene, alkyl substituted styrene, ethylidene norbornene, dicyclopentadiene and cyclopentene, for example. The formed polymer may include homopolymers, copolymers or terpolymers, for example.

Examples of solution processes are described in U.S. Pat. No. 4,271,060, U.S. Pat. No. 5,001,205, U.S. Pat. No. 5,236,998 and U.S. Pat. No. 5,589,555, which are incorporated by reference herein.

One example of a gas phase polymerization process includes a continuous cycle system, wherein a cycling gas stream (otherwise known as a recycle stream or fluidizing medium) is heated in a reactor by heat of polymerization. The heat is removed from the cycling gas stream in another part of the cycle by a cooling system external to the reactor. The cycling gas stream containing one or more monomers may be continuously cycled through a fluidized bed in the presence of a catalyst under reactive conditions. The cycling gas stream is generally withdrawn from the fluidized bed and recycled back into the reactor. Simultaneously, polymer product may be withdrawn from the reactor and fresh monomer may be added to replace the polymerized monomer. The reactor pressure in a gas phase process may vary from about 100 psig to about 500 psig, or from about 200 psig to about 400 psig or from about 250 psig to about 350 psig, for example. The reactor temperature in a gas phase process may vary from about 30° C. to about 120° C., or from about 60° C. to about 115° C., or from about 70° C. to about 110° C. or from about 70° C. to about 95° C., for example. (See, for example, U.S. Pat. No. 4,543,399; U.S. Pat. No. 4,588,790; U.S. Pat. No. 5,028,670; U.S. Pat. No. 5,317,036; U.S. Pat. No. 5,352,749; U.S. Pat. No. 5,405,922; U.S. Pat. No. 5,436,304; U.S. Pat. No. 5,456,471; U.S. Pat. No. 5,462,999; U.S. Pat. No. 5,616,661; U.S. Pat. No. 5,627,242; U.S. Pat. No. 5,665,818; U.S. Pat. No. 5,677,375 and U.S. Pat. No. 5,668,228, which are incorporated by reference herein.)

Slurry phase processes generally include forming a suspension of solid, particulate polymer in a liquid polymerization medium, to which monomers and optionally hydrogen, along with catalyst, are added. The suspension (which may include diluents) may be intermittently or continuously removed from the reactor where the volatile components can be separated from the polymer and recycled, optionally after a distillation, to the reactor. The liquefied diluent employed in the polymerization medium may include a $C_3$ to $C_7$ alkane (e.g., hexane or isobutane), for example. The medium employed is generally liquid under the conditions of polymerization and relatively inert. A bulk phase process is similar to that of a slurry process. However, a process may be a bulk process, a slurry process or a bulk slurry process, for example.

In a specific embodiment, a slurry process or a bulk process may be carried out continuously (in series, parallel or combinations thereof) in one or more loop reactors. The catalyst, as slurry or as a dry free flowing powder, may be injected regularly to the reactor loop, which can itself be filled with circulating slurry of growing polymer particles in a diluent, for example. Optionally, hydrogen may be added to the process, such as for molecular weight control of the resultant polymer. The loop reactor may be maintained at a pressure of from about 27 bar to about 45 bar and a temperature of from about 38° C. to about 121° C., for example. Reaction heat may be removed through the loop wall via any method known to one skilled in the art, such as via a double jacketed pipe.

Alternatively, other types of polymerization processes may be used, such stirred reactors in series, parallel or combinations thereof, for example. Upon removal from the reactor, the polymer may be passed to a polymer recovery system for further processing, such as addition of additives and/or extrusion, for example.

Polymer Product

The polymers (and blends thereof) formed via the processes described herein may include, but are not limited to, linear low density polyethylene, elastomers, plastomers, high density polyethylenes, low density polyethylenes, medium density polyethylenes, polypropylene (e.g., syndiotactic, atactic and isotactic) and polypropylene copolymers, for example.

Unless otherwise designated herein, all testing methods are the current methods at the time of filing.

In one or more embodiments, the polymers include ethylene based polymers.

The ethylene based polymers may have a density (as measured by ASTM-D-792) of from about 0.86 g/cc to about 0.98 g/cc, or from about 0.88 g/cc to about 0.965 g/cc, or from about 0.90 g/cc to about 0.965 g/cc or from about 0.925 g/cc to about 0.97 g/cc, for example.

Such ethylene based polymers may have a molecular weight distribution of at least 4 or at least 5, for example.

The ethylene based polymers may have a melt strength of from about 6.5 cN (centinewton) to about 11 cN, or from about 7 cN to about 11 cN or from about 7 cN to about 10 cN, for example.

The ethylene based polymers may have a melt flow index ($MI_2$) (as measured by ASTM-D-1238-E) of from about 0.01 dg/min (decigram per minute) to about 100 dg/min., or from about 0.01 dg/min. to about 25 dg/min., or from about 0.03 dg/min. to about 15 dg/min. or from about 0.05 dg/min. to about 10 dg/min, for example.

The ethylene based polymers may have a melt index ratio $I_{21}$ (as measured by ASTM-D-1238-F) of at least about 20, or at least about 30, at least about 40, at least about 50 or at least about 55, for example.

In one or more embodiments, the polymers include low density polyethylene.

In one or more embodiments, the polymers include linear low density polyethylene.

In one or more embodiments, the polymers include medium density polyethylene.

In one or more embodiments, the polymers include high density polyethylene.

Product Application

The polymers and blends thereof are useful in applications known to one skilled in the art, such as forming operations (e.g., film, sheet, pipe and fiber extrusion and co-extrusion as well as blow molding, injection molding and rotary molding). Films include blown, oriented or cast films formed by extrusion or co-extrusion or by lamination useful as shrink film, cling film, stretch film, sealing films, oriented films, snack packaging, heavy duty bags, grocery sacks, baked and frozen food packaging, medical packaging, industrial liners, and membranes, for example, in food-contact and non-food contact application. Fibers include slit-films, monofilaments, melt spinning, solution spinning and melt blown fiber operations for use in woven or non-woven form to make sacks, bags, rope, twine, carpet backing, carpet yarns, filters, diaper fabrics, medical garments and geotextiles, for example. Extruded articles include medical tubing, wire and cable coatings, sheets, such as thermoformed sheets (including profiles and plastic corrugated cardboard), geomembranes and pond liners, for example. Molded articles include single and multi-layered constructions in the form of bottles, tanks, large hollow articles, rigid food containers and toys, for example.

One or more embodiments of the invention include utilizing the polymers in solid state stretching applications, such as thermoforming, drawn tape, drawn monofilament, mono direction oriented film, biaxially oriented film, solid state extrusion and injection stretch blow molding, for example.

EXAMPLES

Examples 1-7 of Ziegler-Natta catalyst intermediate compounds were prepared in a 500 mL (milliliter) reactor equipped with four Morten's indentions and a dropping funnel, and an overhead agitation system having two three-blades impellers for mixing.

As used herein, "BEM" refers to 20.2 wt. % solution of butyl ethyl magnesium (containing 0.12 wt. % Al in the form of TEAl).

As used herein, "TEAl" refers to triethyl aluminum.

As used herein, "2-EHOH" refers to 2-ethylhexanol.

As used herein, "TNBT" refers to tetra n-butyl titanate.

The nine examples of Ziegler-Natta catalyst intermediate compounds were synthesized and prepared using the following reaction scheme at hexane reflux for various periods of time:

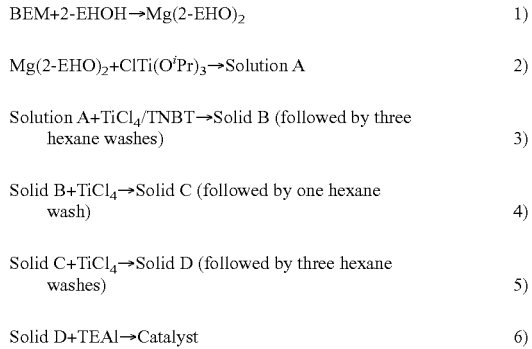

In synthesizing and preparing examples 1-7 of the Ziegler-Natta catalyst intermediate compounds, in step 1), 100 mmol (millimole) (54.7 g (gram)) of BEM was slurried in hexane (total volume 100 mL) and the mixture was stirred (250 rpm (revolutions per minute)) at room temperature. In addition, 216 mmol (28.18 g) of 2-EHOH was slurried in 50 mL of hexane and the resulting solution was added dropwise to the BEM solution at room temperature over 30 minutes. The reaction mixture was then stirred at room temperature for another hour.

The preparation then included step 2) of adding 100 mL hexane solution of 100 mmol of a first agent of chlorotitaniumtriisopropoxide (ClTi(O$^i$Pr)$_3$) (2M in hexane) to the magnesium dialkoxide (Mg(2-EHO)$_2$) at room temperature over 30 minutes. A clear, solid-free solution of reaction product or mixture "A" was obtained. The solution of reaction product or mixture "A" was then stirred at room temperature for another hour.

The preparation then included step 3) of adding 300 mL hexane solution of a second agent of titanium tetrachloride/tetra n-butyl titanate (TiCl$_4$/TNBT, TiCl$_4$=200 mmol and TNBT=100 mmol) to the solution of reaction product or mixture "A" to obtain a solid reaction product or mixture "B". The solid reaction product or mixture "B" was continued stirred at room temperature for another hour. The solid reaction product or mixture "B" was then washed with hexane three times, each with 200 mL. The solids were then re-suspended in 100 mL of hexane.

The preparation then included step 4) of adding 100 mmol (19.0 g) of a third agent of titanium tetrachloride (TiCl$_4$) (diluted to 50 mL in hexane) slowly to the reaction product or mixture "B" at room temperature over 20 minutes to form a solid reaction product or mixture "C". The solid reaction product or mixture "C" was then stirred at room temperature for another hour. The solid reaction product or mixture "C" was then decanted and the solids were washed with one wash of 200 mL of hexane. The solids were then suspended in 100 mL of hexane.

The preparation then included step 5) of adding 100 mmol (19.0 g) of a fourth agent of titanium tetrachloride (TiCl$_4$) (diluted to 50 mL in hexane) slowly to the reaction product or mixture "C" at room temperature over 20 minutes to form a solid reaction product or mixture "D". The solid reaction product or mixture "D" was then stirred at room temperature for another hour. The solid reaction product or mixture "D" was then decanted and the solids were washed three times with 200 mL of hexane. The solids were then suspended in 100 mL of hexane.

The preparation then included step 6) of adding 16 mmol (7.39 g) of a fifth agent of triethyl aluminum (TEAl) (25 wt. % in hexane) to the reaction product or mixture "D" at room temperature over 25 minutes to form the final catalyst. Each catalyst compound was then stirred at room temperature for another hour. Each catalyst compound was then decanted and dried, resulting in a yield of about 18 g.

For examples 1-6, the catalyst intermediate compounds formed as described above were then heat-treated at hexane reflux (a temperature of 80° C.). Example 1 included heat-treating Reaction Product B for 12 hours, before hexane wash. Example 2 included heat-treating Reaction Product C for 12 hours, before hexane wash. Example 3 included heat-treating Reaction Product D for 3 hours, before hexane wash. Example 4 included heat-treating Reaction Product C for 3 hours, after hexane wash. Example 5 included heat-treating the formed catalyst for 3 hours. Example 6 included heat-treating Reaction Product D for 24 hours, before hexane wash.

Example 7 did not undergo heat-treatment.

Particle size distributions showed no influence by the heat-treatment on catalyst morphologies. FIG. 1 illustrates a graph of particle size distributions for heat-treated catalyst example 4, and example 5, as compared to solid B before heat-treatment. Example 4 and example 5 were synthesized sharing same batch of solid B intermediate, but each used only a half of the solid B material. Example 4 and 5 both had similar particle size distributions as their non-heat-treated solid B intermediate.

Polymerizations with the example 1-7 catalysts were performed under the following conditions (125 psig (pound-force per square inch gauge), 80° C., 1 hour, H$_2$/C$_2$ feed ratio=0.25, C$_2$=8 SLPM (standard liters per minute) and [TIBAl (triisobutyl aluminum)]=0.25 mmol/L (milimole per liter)). The polymerization results of the heat-treated catalyst examples 1-6 and non-heat-treated catalyst example 7 are summarized in Table 1.

All the heat-treated catalysts showed higher activities than non-heat-treated example 7. Most of the fluffs of the modified heat-treated Ziegler-Natta catalysts had lower bulk densities than non-heat-treated example 7 due to increased fluff D50's (particle size), thus reduced particle packing efficiency, except for example 1.

TABLE 1

| | Catalysts | | | | | | |
|---|---|---|---|---|---|---|---|
| | 1 | 2 | 3 | 4 | 5 | 6 | 7 |
| Activity (g/g/h) | 24,000[1] | 34,000[1] | 37,000[1] | 38,000[2] | 32,000[1] | 39,000[1] | 17,000[1] |
| B.D. (g/cc) | 0.36 | 0.21 | 0.31 | 0.29 | 0.33 | 0.28 | 0.40 |
| $MI_2$ (dg/min) | 0.23 | 0.16 | 0.35 | 0.45 | 0.68 | 0.02 | 0.79 |
| $MI_5$ (dg/min) | 0.72 | 0.52 | 1.61 | 1.86 | 2.59 | 0.44 | 3.01 |
| HLMI (dg/min) | 7.2 | 6.1 | 21.2 | 24.90 | 30 | 8.20 | 39.70 |
| SR2 | 31.3 | 38.1 | 60.6 | 55.3 | 44.1 | 410.0 | 50.30 |
| SR5 | 10.0 | 11.7 | 13.2 | 13.4 | 11.6 | 18.6 | 13.2 |
| $M_n$ (g/mol) | 32,000 | 28,000 | 21,000 | 15,000 | 22,000 | 26,000 | 18,000 |
| $M_w$ (g/mol) | 194,000 | 222,000 | 192,000 | 118,000 | 129,000 | 217,000 | 132,000 |
| $M_z$ (g/mol) | 938,000 | 1,540,000 | 2,215,000 | 539,000 | 642,000 | 1,671,000 | 742,000 |
| MWD ($M_w/M_n$) | 6.1 | 7.9 | 9.0 | 7.6 | 6.0 | 8.3 | 7.3 |
| MWD ($M_z/M_w$) | 4.8 | 7.0 | 11.5 | 4.6 | 5.0 | 7.7 | 5.6 |
| Density (g/cc) | 0.954 | 0.956 | 0.958 | 0.960 | 0.959 | 0.957 | 0.960 |
| D50 (micron) | 234 | 371 | 345 | 429 | 328 | 269 | 305 |
| Fines (<63μ) | 4.7 | 1.4 | 0.0 | 0.2 | 0.4 | 0.0 | 0.0 |
| Wax (wt %) | 0.4 | 0.8 | 0.4 | 0.3 | 0.6 | 0.3 | 0.8 |

[1] Mg based activities.
[2] Mass balance derived activities.

It was also seen that heat-treatment decreased the catalyst hydrogen response. The effect was less severe if the heat-treatment was conducted on the preactivated catalyst (example 5).

Figure 2:
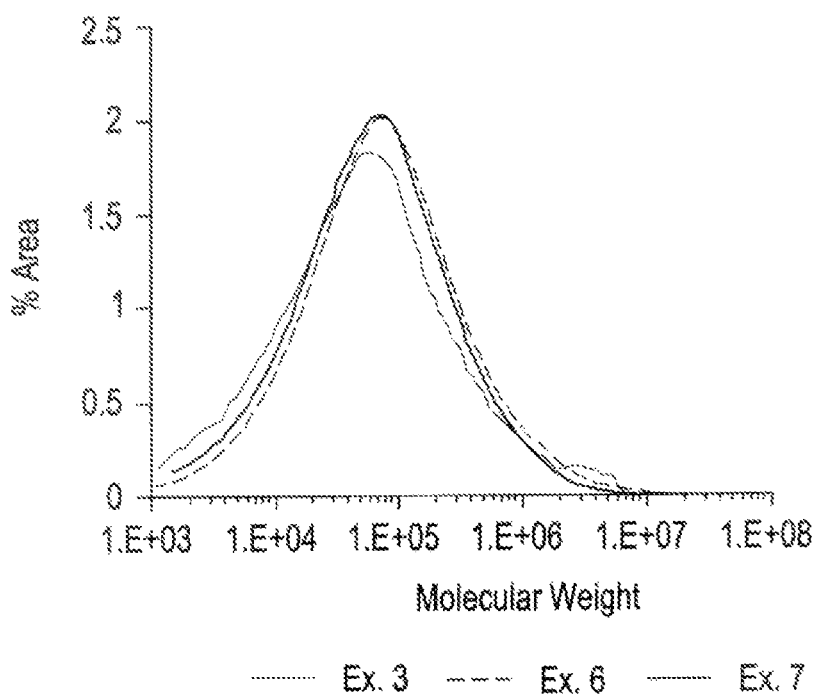
FIG. 2 illustrates a graph of molecular weight distributions for certain examples using heat-treated catalysts as compared to a non-heat-treated catalyst.

The shear responses of polymer from heat-treated catalyst example 6 were larger than non-heat-treated catalyst example 7 and both molecular weight distributions (MWD) of polymers from the heat-treated catalyst example 3 and example 6 were broadened, as compared to non-heat-treated catalyst example 7. FIG. 2 illustrates a graph of molecular weight distributions (MWD) of heat-treated catalyst example 3 and example 6, as compared to non-heat-treated catalyst example 7.

Increased contribution from lower molecular weight was obtained at shorter heating time (3 hours, example 3) while longer heating time increased the contribution of higher molecular weights (example 6). As a result, the improved shear responses and molecular weight distributions (MWD) were achieved by heat-treating the Ziegler-Natta catalyst intermediates.

Thus, Ziegler-Natta catalyst intermediates for improved film application were unexpectedly obtained by heat-treating the Ziegler-Natta catalyst intermediates in order to increase shear response and obtain a higher shear thinning of polymers contacted by such heat-treated catalysts. In addition, Ziegler-Natta catalyst intermediates for improved film application were unexpectedly obtained by heat-treating the Ziegler-Natta catalyst intermediates in order to broaden molecular weight distribution (MWD) and obtain a broader MWD of polymers contacted by such heat-treated catalysts.

While the foregoing is directed to embodiments of the present invention, other and further embodiments of the invention may be devised without departing from the basic scope thereof and the scope thereof is determined by the claims that follow.

What is claimed is:

1. A process of forming a catalyst system comprising:
   contacting a blend of an alkyl magnesium compound and an organoaluminum compound with an alcohol to form a magnesium dialkoxide compound;
   contacting the magnesium dialkoxide compound with a first agent to form a solution of reaction product "A", the first agent comprising a halogenating or titanating agent;
   contacting the solution of reaction product "A" with a second agent to form a solid reaction product "B", the second agent comprising a blend of a first metal halide and a metal alkoxide;
   contacting the solid reaction product "B" with a third agent to form a solid reaction product "C", the third agent comprising a second metal halide;
   contacting the solid reaction product "C" with a fourth agent to form a solid reaction product "D", the fourth agent comprising a third metal halide;
   contacting the solid reaction product "D" with a fifth agent to form a catalyst component, the fifth agent comprising a reducing agent; and
   heating an intermediate selected from reaction product "A" prior to contacting with the second agent, reaction product "B" prior to contacting with the third agent, reaction product "C" prior to contacting with the fourth agent, reaction product "D" prior to contacting with the fifth agent, and combinations thereof,
   wherein the heat-treated catalyst forms a polymer product having a shear response and a molecular weight distribution greater than a shear response and a molecular weight distribution of a polymer produced by a non-heat treated catalyst.

2. The process of claim 1, wherein the alkyl magnesium compound is selected from butyl ethyl magnesium, diethyl magnesium, dipropyl magnesium, dibutyl magnesium and combinations thereof.

3. The process of claim 1, wherein the organoaluminum compound is selected from triethyl aluminum, trimethyl aluminum, triisobutyl aluminum and combinations thereof.

4. The process of claim 1, wherein the alcohol is selected from 2-ethylhexanol, butanol, isobutanol and combinations thereof.

5. The process of claim 1, wherein the magnesium dialkoxide compound is magnesium 2-ethyl hexyl alkoxide ($Mg(2-EHO)_2$).

6. The process of claim 1, wherein the first agent is generally represented by the formula:

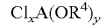

$Cl_xA(OR^4)_y,$ wherein A is selected from titanium, silicon, aluminum, carbon, tin and germanium, $R^4$ is selected from $C_1$ to $C_{10}$ linear or branched alkyls comprising methyl, ethyl, propyl and isopropyl, x is 0 or 1, and y is the valence of A minus x.

7. The process of claim 1, wherein the first agent is a halogenating or titanating agent selected from chlorotitaniumtriisopropoxide (ClTi(O$^i$Pr)$_3$), chlorotrimethylsilane (ClSi(Me)$_3$) and combinations thereof.

8. The process of claim 1, wherein the blend of a first metal halide and a metal alkoxide of the second agent is represented by the formula:

TiCl$_4$/Ti(OR$^5$)$_4$ wherein R$^5$ is selected from C$_2$ to C$_{20}$ alkyl groups.

9. The process of claim 1, wherein the second agent is selected from a titanium tetrachloride/tetra n-butyl titanate (TiCl$_4$/TNBT) blend, a titanium tetrachloride/titanium 2-ethylhexyl alkoxide blend, and combinations thereof.

10. The process of claim 1, wherein the third agent is titanium tetrachloride (TiCl$_4$).

11. The process of claim 1, wherein the fourth agent is titanium tetrachloride (TiCl$_4$).

12. The process of claim 1, wherein the fifth agent comprises an organoaluminum compound selected from triethyl aluminum, trimethyl aluminum, triisobutyl aluminum and combinations thereof.

13. The process of claim 1, wherein heating the intermediate to form the heat-treated catalyst is conducted at a temperature in a range of about 80° C. to about 150° C., and is for a time period in the range of about thirty minutes to about twenty-four hours.

14. The process of claim 1, wherein the polymer produced by the heat-treated catalyst has a shear response (SR5) of greater than 10.0.

15. The process of claim 1, wherein the polymer produced by the heat-treated catalyst has a molecular weight distribution of greater than 6.5.

16. A polymerization process comprising:

introducing an olefin monomer into a reaction zone;

contacting the olefin monomer with a heat-treated Ziegler-Natta catalyst formed by the process of claim 1 to form a polyolefin; and withdrawing the polyolefin from the reaction zone.

* * * * *